United States Patent
Sripadarao et al.

(10) Patent No.: US 9,177,383 B2
(45) Date of Patent: Nov. 3, 2015

(54) FACIAL DETECTION

(71) Applicant: ANALOG DEVICES TECHNOLOGY, Hamilton (BM)

(72) Inventors: Anil M. Sripadarao, Bangalore (IN); Bijesh Poyil, Bangalore (IN)

(73) Assignee: Analog Devices Global, Hamilton (BM)

( * ) Notice: Subject to any disclaimer, the term of this patent is extended or adjusted under 35 U.S.C. 154(b) by 133 days.

(21) Appl. No.: 14/013,122

(22) Filed: Aug. 29, 2013

(65) Prior Publication Data

US 2015/0063708 A1    Mar. 5, 2015

(51) Int. Cl.
| G06K 9/48 | (2006.01) |
| G06T 7/00 | (2006.01) |
| G06K 9/62 | (2006.01) |

(52) U.S. Cl.
CPC ............ *G06T 7/0085* (2013.01); *G06K 9/6267* (2013.01)

(58) Field of Classification Search
None
See application file for complete search history.

(56) References Cited

U.S. PATENT DOCUMENTS

| 5,268,967 A * | 12/1993 | Jang et al. ..................... 382/132 |
| 5,335,298 A | 8/1994 | Hevenor et al. |
| 6,453,069 B1 * | 9/2002 | Matsugu et al. ............... 382/173 |
| 8,260,011 B2 | 9/2012 | Husoy |
| 8,295,610 B1 | 10/2012 | Brunner |
| 8,325,998 B2 | 12/2012 | Yang et al. |
| 8,340,185 B2 * | 12/2012 | Biswas et al. ............ 375/240.16 |
| 8,379,917 B2 | 2/2013 | Bigioi et al. |
| 8,576,303 B2 * | 11/2013 | Vendrig ......................... 348/239 |
| 2011/0188713 A1 * | 8/2011 | Chin et al. ..................... 382/118 |

FOREIGN PATENT DOCUMENTS

| EP | 1532585 | 5/2005 |
| EP | 2052347 | 4/2009 |
| WO | 2012/139239 | 10/2012 |

OTHER PUBLICATIONS

S. Anila et al., "Simple and Fast Face Detection System Based on Edges," International Journal of Universal Computer Sciences (vol. 1-2010/Iss.2), pp. 54-48.

Toshiaki Kondo et al., "Automatic Human Face Detection and Recognition Under Non-Uniform Illumination," Pergamon, Pattern Recognition 32 (1999), pp. 1707-1718.

* cited by examiner

*Primary Examiner* — Daniel Mariam
(74) *Attorney, Agent, or Firm* — Patent Capital Group

(57) ABSTRACT

In one aspect, there is disclosed a digital signal processor and method performed by the same for performing object detection, including facial detection, in a reduced number of clock cycles. The method comprises using Sobel edge detection to identify regions with many edges, and classifying those regions as foreground candidates. Foreground candidates are further checked for vertical or horizontal symmetry, and symmetrical windows are classified as face candidates. Viola-Jones type facial detection is then performed only on those windows identified as face candidates.

21 Claims, 5 Drawing Sheets

FACIAL DETECTION

FIELD OF THE DISCLOSURE

This application relates to the field of image processing, and more particularly to a system and method for object detection based on edges.

BACKGROUND

The Viola-Jones object detection framework is known in the art, having been proposed by Paul Viola and Michael Jones in 2001. Viola-Jones operates by calculating the sum of pixels in rectangular areas of an image. While coarse in resolution, Viola-Jones is sensitive to vertical and horizontal features such as edges.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
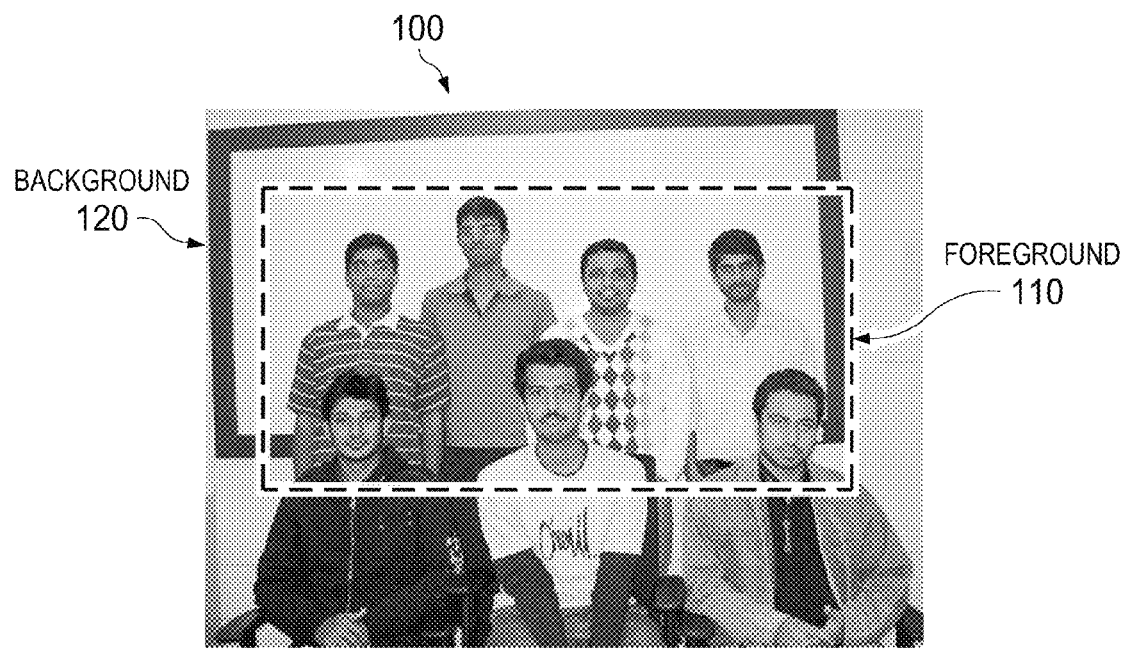
FIG. 1 is a is a photographic representation of a grayscale digital image.

In one aspect, there is disclosed an object detection method, performed on a digital signal processor, for identifying objects of interest in a foreground region of a digital image with reduced consumption of clock cycles, the method comprising dividing the digital image into a plurality of windows; performing edge detection on each window; classifying each window as a foreground candidate or background candidate, wherein classifying comprises computing a number of edges for the window and classifying the window as a foreground candidate only if the number of edges for the window is greater than a threshold; and performing additional object detection only on those windows classified as foreground candidates.

In another aspect, there is disclosed a tangible computer-readable storage medium having stored thereon software instructions for a digital signal processor, the instructions adapted for identifying objects of interest in a foreground region of a digital image with reduced consumption of clock cycles, the instructions configured to instruct a processor to divide the digital image into a plurality of windows; perform edge detection on each window; classify each window as a foreground candidate or background candidate, wherein classifying comprises computing a number of edges for the window and classifying the window as a foreground candidate only if the number of edges for the window is greater than a threshold; and perform additional object detection only on those windows classified as foreground candidates.

A digital signal processing system configured to identify objects of interest in a foreground region of a digital image with reduced consumption of clock cycles, the system comprising a processor; and a memory communicatively coupled to the processor and having stored thereon instructions that, when executed, instruct the processor to: divide the digital image into a plurality of windows; perform edge detection on each window; classify each window as a foreground candidate or background candidate, wherein classifying comprises computing a number of edges for the window and classifying the window as a foreground candidate only if the number of edges for the window is greater than a threshold; and perform additional object detection only on those windows classified as foreground candidates.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiment many have different advantages, and no particular advantage is necessarily required of any embodiment.

The example method operates on a grayscale bitmap image. A grayscale image may be represented as a large two-dimensional array of integer values, wherein each pixel is defined by an intensity value ranging between 0 (pure black, or total absence of intensity) and 1 (pure white, or total presence of intensity). The intensity value is a theoretically infinitely-precise fractional value, though in practice its resolution is limited by bit depth, with each integer value representing a fractional value (for example, at 16 bits, each value is a decimal value n represented by integer I, where $$n = \frac{I}{65535}).$$

Because intensities are represented by simple integers, a processor can process them using relatively fast integer instructions.

Edges in a grayscale image may be identified by the Sobel operator, which is a gradient vector calculated for each pixel. A derivative of a single point cannot be calculated, but if it is assumed that the grayscale image represents a group of sampled points from a continuous intensity function, then the derivative can be computed piecewise as a function of the sampled intensities. The Sobel operator provides a gradient by sampling a region around each pixel, for example 3×3 or 5×5 pixels, and approximating the gradient at that point based on the calculation.

The Sobel operator is a discrete differential operator, the result of which is a vector representation of the gradient at each computed point in an image. A commonly-used Sobel operator uses two 3×3 kernels, which are convolved with a region of the digital image. The convolution yields two vectors, representing the magnitude and direction of the horizontal gradient, and magnitude and direction of the vertical gradient. In particular, the horizontal gradient is defined as $$G_x = \begin{bmatrix} +1 & 0 & -1 \\ +2 & 0 & -2 \\ +1 & 0 & -1 \end{bmatrix} * A,$$

and the vertical gradient is defined as $$G_y = \begin{bmatrix} +1 & +2 & +1 \\ 0 & 0 & 0 \\ -1 & -2 & -1 \end{bmatrix} * A,$$

where A is the source image and * is the two-dimensional convolution operator. The composite gradient magnitude is calculated as $G=\sqrt{G_x^2+G_y^2}$. The gradient direction is calculated as $\theta=a\tan 2(G_y,G_x)$. The gradient magnitude may then pass through a threshold block. Pixels with gradient values higher than the threshold are marked as edges and others are marked as non-edge pixels.

Object detection is an image processing technique that may be used to locate objects of interest in digital images. In particular, grayscale images may be usefully characterized as containing objects of interest such as people, cars, faces, animals, or foreign objects. An "object of interest" is any object that a system of the present specification is tasked with identifying, locating, classifying, or otherwise detecting in digital images. This may be useful, for example, in a video security context, where a camera may provide a video stream. The utility of such a system may be enhanced by providing a processing system, such as a digital signal processor system, that is capable of parsing each frame in real time, or near-real time, and identifying objects of interest such as faces. After identifying faces, the system may pass identified faces to a post-processing system that further performs facial recognition in instances where identifying not only the presence, but also the identity of a person within the frame is desirable. For example, a system may be designed to analyze a video stream and identify the presence of humans, which may represent an alert condition, but not provide an alert upon detecting the presence of animals.

As a general rule, processing resources spent on analyzing an image are directly proportional to the confidence in identification. It is not always practical, however, to spend large amounts of processing resources on every part of a digital picture, particularly where real-time processing is a concern. Thus, it is beneficial to provide pre-filter steps that can reliably eliminate certain portions of the digital image from processing. For example, a pre-filter step may divide the digital image into N windows of various sizes. A "window" throughout this specification means any portion of a digital image, up to and including the whole image that is selected for analysis. Although rectangular windows are disclosed herein by way of example, windows of other shapes may be useful for certain applications, and it is not intended to limit this specification to rectangular windows. Of the N windows, M windows may be reliably classified as not containing an object of interest. Thus, the DSP need only examine N−M windows with its higher-reliability, more processor-intensive techniques. A useful characteristic of some pre-filtering techniques is a near-zero rate of false negatives, but tolerance for a relatively high rate of false positives. In other words, a useful pre-filter may be configured to almost never falsely reject a window containing an object of interest, but it is tolerable for the pre-filter to only reject, for example, 60-80% of windows without objects of interest.

The accuracy of an object detection system is dependent in part on the quality of the edge produced by edge detection operation. "Edge detection" by means of the Sobel operator is disclosed herein by way of example, though those with skill in the art will recognize that there are many techniques for identifying edges or edge-like features in a digital image, and the process of edge detection as used herein is intended to broadly encompass any technique, method, algorithm, or process for identifying discrete features such as edges in a digital image. The quality of edge detection in turn is dependent on the threshold value (nSobelThresh) chosen for the gradient magnitude. A lower gradient magnitude will result in more detected edges. The optimal value of the threshold varies between different embodiments, and may depend on factors including ambient lighting, background, and the number of objects present. Thus, there is no single preferred threshold that will work for every embodiment, though some algorithms for adaptive threshold selection are known in the art, such as "Otsu's thresholding." Some such algorithms are too computationally intensive to be used with certain embodiments of the present disclosure.

While drawn generally to automated object detection, the present specification is more easily understood in relation to a concrete embodiment disclosed herein and shown in the figures, relating particularly to facial detection. The embodiment disclosed herein is adapted to provide real-time or near-real-time facial detection at full video graphics array (VGA) resolution of 640×480 pixels at approximately 3 frames per second (FPS). This means that if the video source provides a VGA video stream at 30 FPS, approximately one in every ten frames will be analyzed for object detection, while consuming approximately 500 millions of instructions per second (MIPS). In an example, detection can be carried out on a Blackfin BF609 dual-core digital signal processor (DSP) hosted on a BF609EZ evaluation board, both from Analog Device, Inc. The BF609 includes a pipeline vision processor (PVP), which is a set of functional hardware blocks next to the DSP core designed to perform basic image preprocessing, such as calculating the Sobel operator for an image.

This speed may be suitable for certain purposes, such as for security applications, where a temporal resolution of ⅓ second is acceptable. Other applications may require higher temporal or video resolution (such as HD or full 30 FPS resolution). In that case, additional processor cores may be necessary. It is also notable that in certain cases, a background region of an image may be very simple, in which case higher-resolution processing may be possible on the same hardware.

In one example embodiment, an image is divided into 24×24-pixel windows, with a total of 162,336 possible features per window. For a VGA-resolution image of 640×480 pixels, there are a total of 280,896 such windows, requiring a total of 87.7 million feature calculations. At 30 frames per second, this yields a theoretical maximum of approximately 2.6 billion features to process per second in real time, which is impractical for some embedded processors, particularly because each feature calculation takes multiple clock cycles. Furthermore, the foregoing considers only one of many possible scales, while in practice processing may be performed at several scales for each frame.

Figure 5:
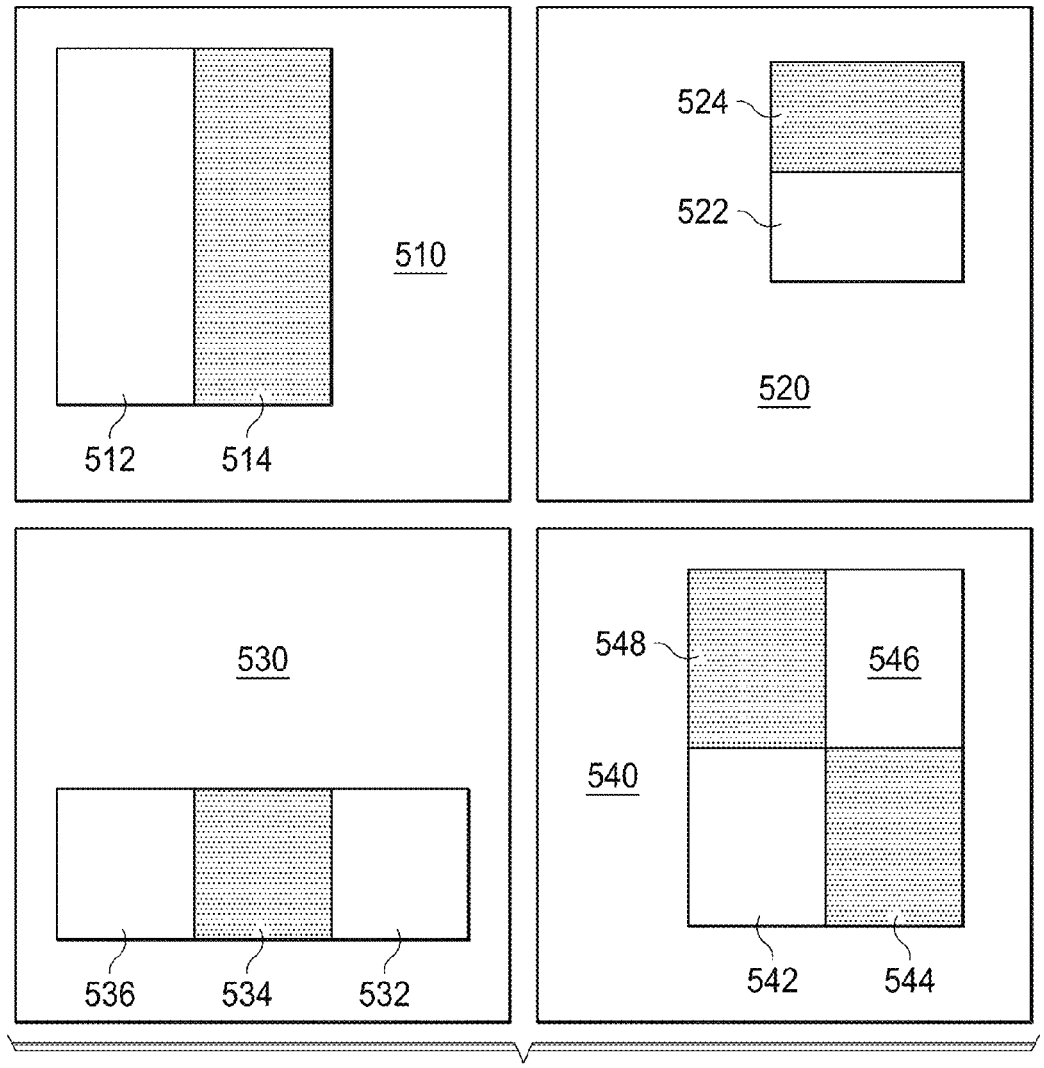
FIG. 5 is a block representation of feature shapes for an example Viola-Jones detection method.

According to an example embodiment, the Viola-Jones method provides high-reliability object detection, and is run only on certain windows that pass a pre-screening process. In an example method, a grayscale image is divided into a plurality of regions, each region including a plurality of rectangles. FIG. 5 is a representation of feature sets used by the Viola-Jones framework. In each case, the value of a feature is computed as a sum of absolute differences (SAD) comprising the difference between the sum of pixels in the shaded region and the sum of the pixels in the unshaded region. For example, feature 510 is a two-rectangle feature, with regions 512 and 514. The value of this feature is $|\Sigma 514 - \Sigma 512|$. Similarly, feature 520 is a two-rectangle feature with regions 522 and 524. The value of feature 520 is $|\Sigma 524 - \Sigma 522|$. Feature 530 is a three-rectangle feature with regions 532, 534, and 536. The value of feature 530 is $|\Sigma 534 - (\Sigma 532 + \Sigma 536)|$. Feature 540 is a four-rectangle feature with regions 542, 544, 546, and 548. The value of feature 540 is $|\Sigma 544 + \Sigma 548) - (\Sigma 542 + \Sigma 546)|$.

Although these SADs can individually be calculated very quickly, the number of SADs is large enough to prohibit individual calculation of every possible SAD. For example, on a 640×480 VGA image, a window can be selected with theoretically any rectangular size between 1×1 pixel and 640×480 pixels. The number of windows in the image will vary between 307,200 windows (at 1×1 pixel) and 1 window (at 640×480 pixels). Note however that for many uses, these extreme examples do not provide a useful window for feature detection. They are disclosed here as edge-of-the-envelope cases.

In some example hardware architectures, it is challenging to run the full Viola-Jones framework on an entire digital image, operating on every possible window at multiple scales, in real time. One method of alleviating the computational demand is to choose an appropriate scale in which the object of interest would be expected to be located, and shifting the window by a $\partial X$. As a baseline, $\partial X$ has both an X component and a Y component, and each could be selected as one pixel, but this may result in a prohibitively large number of windows. So instead, $\partial X_X$ may be selected based on window size in cases where objects of interest are less likely to be found in the next window. For example, consider a 640×480 pixel image, with the expected range for faces between 24×24 and 100×100 pixels. In this case, the detector can be run on 414,992 different windows. Running the detector on a window requires finding the features for every tree and performing thresholding at every cascade stage. This load can be reduced, however, by moving each window by a factor such as width$_{window}$/2 rather than a single pixel each time if a window is deemed to be a background window. For example, at the scale 24×24 pixels, $\partial X_X$ may be selected as 12 pixels for windows that are found to be background windows. The value of $\partial X_X$ may remain at 1 for windows found to be foreground windows.

$\partial X$ also has a Y component, $\partial X_Y$. In an example, $\partial X_Y$ is selected based on the total number of windows passed to the detection stage in a particular row. If there are no foreground windows in the row, $\partial X_Y$ may be selected as height$_{window}$/2.

The method of the present disclosure also contemplates the use of edge information, based on the Sobel operator, to eliminate windows that are poor candidates for objects of interest. Edges can provide a useful approximation of underlying patterns. The method disclosed herein uses edge information to discard many (sometimes even most) windows before selecting windows to receive the complete Viola-Jones analysis. In one example, the Sobel operator, providing a gradient vector, is calculated for each pixel in the image, and may be provided by dedicated hardware such as a pipeline vision preprocessor (PVP), as is provided in some Analog Devices, Inc. digital signal processors (DSPs). The integral sum of the edge output is then calculated.

Figure 2:
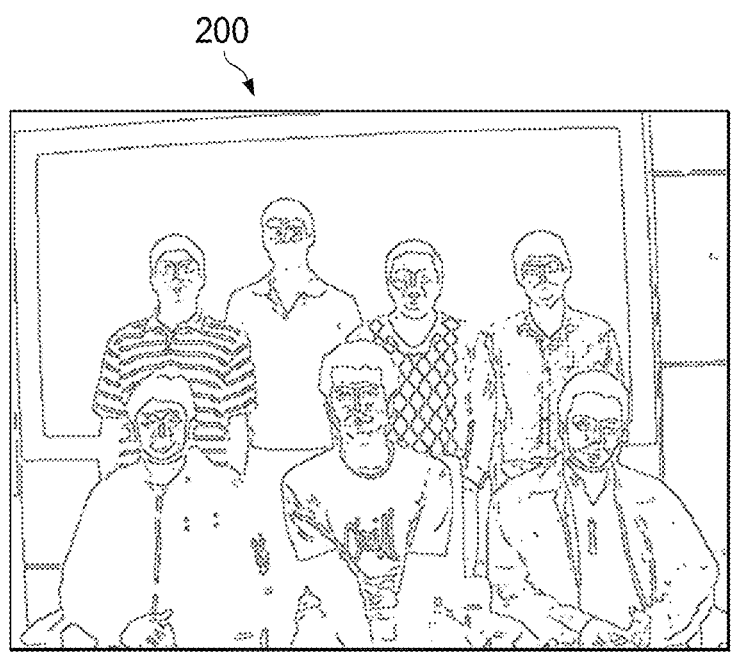
FIG. 2 is an edge detected image calculated from the Sobel operator of the digital image of FIG. 1.
Figure 2A:
FIG. 2A is an enlarged view of a face window selected from the edge image of FIG. 2.

In one example, an image such as the digital image 100 of FIG. 1 is analyzed for objects of interest, such as faces. Digital image 100 includes a foreground region 110 and a background region 120. A foreground candidate window in general contains more edges than a background candidate window, so this classification filters out background regions with sparse edges. Note that not all foreground candidate windows will fall within foreground region 110, and not all background candidate windows will fall within background 120. In this example, the method uses the integral sum of edges image to find the total number of pixels in a particular window. FIG. 2 provides a graphical representation of an edge detected picture 200, based on digital image 100 of FIG. 1. In particular, FIG. 2A is an enlarged view of a face window 210, demonstrating that face window 210 has a relatively large number of edges. This technique may reduce cycles needed for computing the sum of edge pixels over a window, and therefore imposes minimal overhead on the total computation time.

This classification does not guarantee, and is not designed to guarantee, that all non-face regions are filtered out. Certain complex background features may contain many edges, and those will not be eliminated at this filtering stage. Notably, this is not the same complex foreground/background classification that is performed by some prior art methods. Rather this act of classifying may be relatively rough, and is relatively more tolerant to false positives (with respect to foreground classification) than false negatives. In general, the terms "classifying" or "classification" as used throughout this specification include any act of dividing one or more discrete items into one of a plurality of possible groupings, designations, orders, or categories. The terms "subclassifying" or "subclassification" as used throughout this specification include any ace of dividing one or more discrete items already classified into one of a plurality of possible subordinate groupings, designations, orders, or categories. In this example, the focus of this step is on eliminating a large number of windows from the Viola-Jones framework. The only negative cost of false positives is that additional windows will be processed, thus reducing processor efficiency. In one example, it is acceptable to eliminate only 60-80% of the background windows in this step (a false positive rate of 20-40%).

An additional tier filtering step may be provided by checking the remaining windows for a high degree of vertical symmetry. Only those windows with vertical symmetry within a defined threshold are passed on for full, processor-intensive Viola-Jones analysis. The window may be divided into two vertical subwindows, and the total number of edges in each subwindow are compared to a threshold. Windows that have sufficient edges in each subwindow are classified as face (or object of interest) candidates (designated for additional processing), while windows that do not have sufficient edges in each subwindow are eliminated from further processing. In another example embodiment, the window is divided both vertically and horizontally, and each of the four subwindows may be checked for sufficient edges against a threshold.

In one example, windows may be analyzed for multi-block local binary pattern (MB-LBP) features. In this case, for every tree in a cascade stage of the Viola-Jones method, the system accesses 16 memory locations from the integral image and performs 8 comparisons. These may be located randomly throughout system memory. As these buffers are large, they may not be stored efficiently in L1 or cache memory for an embedded processor, and so accessing them randomly may cause expensive cache misses, severely impacting processing efficiency.

As access to the edge integral image 200 is not random in nature, DMA can be used to bring the data needed for classification to fast internal memory, thus reducing the cycles overhead further. Specifically, at a particular scale, the filtering process needs to access the edge integral sum values from only two rows. Those values can be transferred to internal memory using DMA and then used for processing.

Turning now to the attached figures, FIG. 1 is a photographic representation of an example digital image, including a foreground region 110 and a background region 120. For purposes of this specification, a "foreground" window is any region, area, or position within a digital image where an object of interest is probable to found within the parameters of a particular application. A "background" window is any region, area, or position within a digital image where an object of interest is not likely to be found within the parameters of a particular application. FIG. 2 is an example representation of an edge image 200 calculated from the Sobel operator of digital image 100. FIG. 2A is an enlarged view of a detected face window 210 from integral image 200. As can be seen in FIG. 2A, face window 210 has relatively many edges. In one example embodiment, the images of FIG. 1 and FIG. 2 are used in the method of FIG. 4, as implemented on the hardware of FIG. 3.

Figure 3:
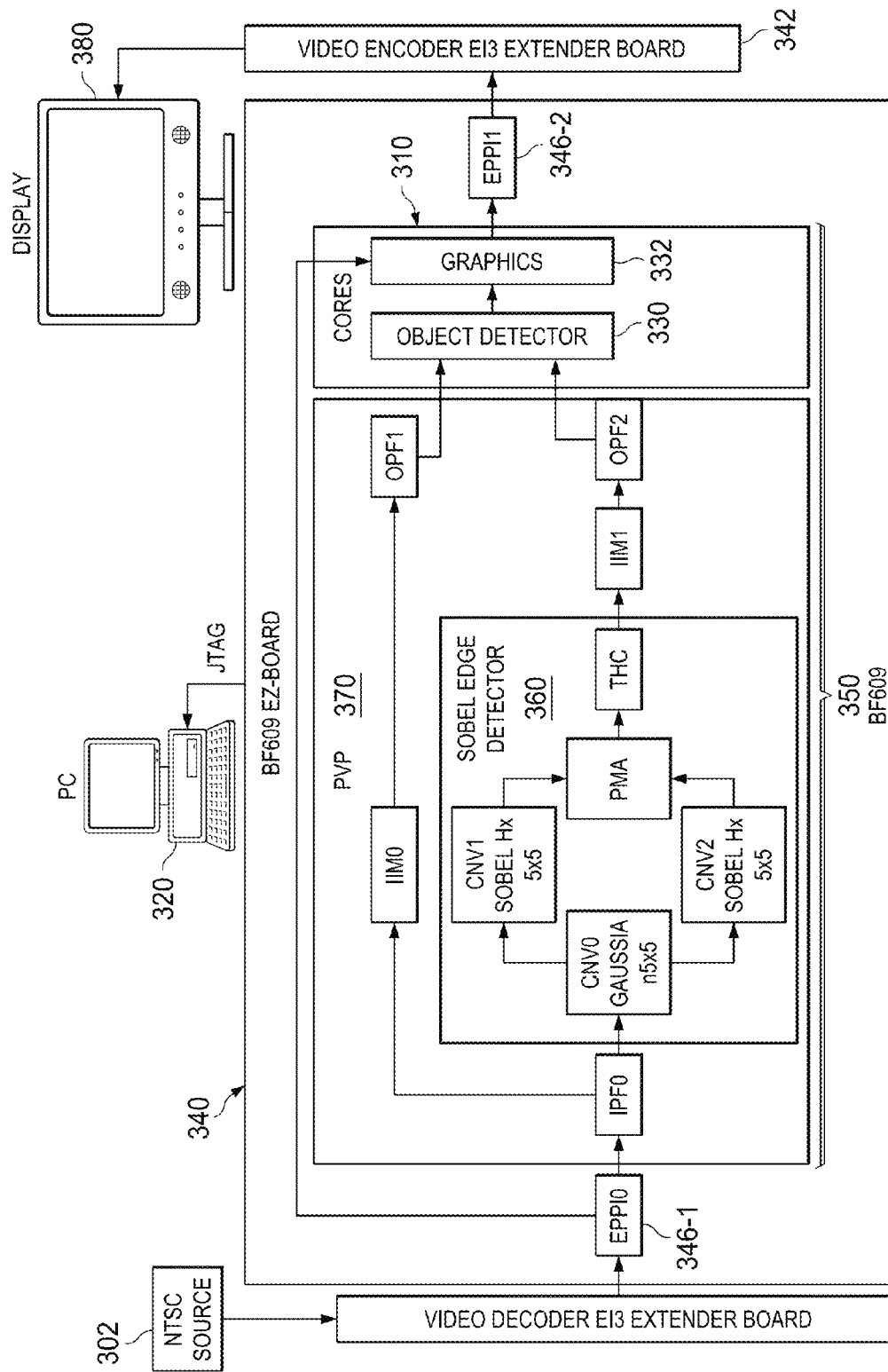
FIG. 3 is a block diagram of an example hardware platform in accordance with the present specification.
Figure 4:
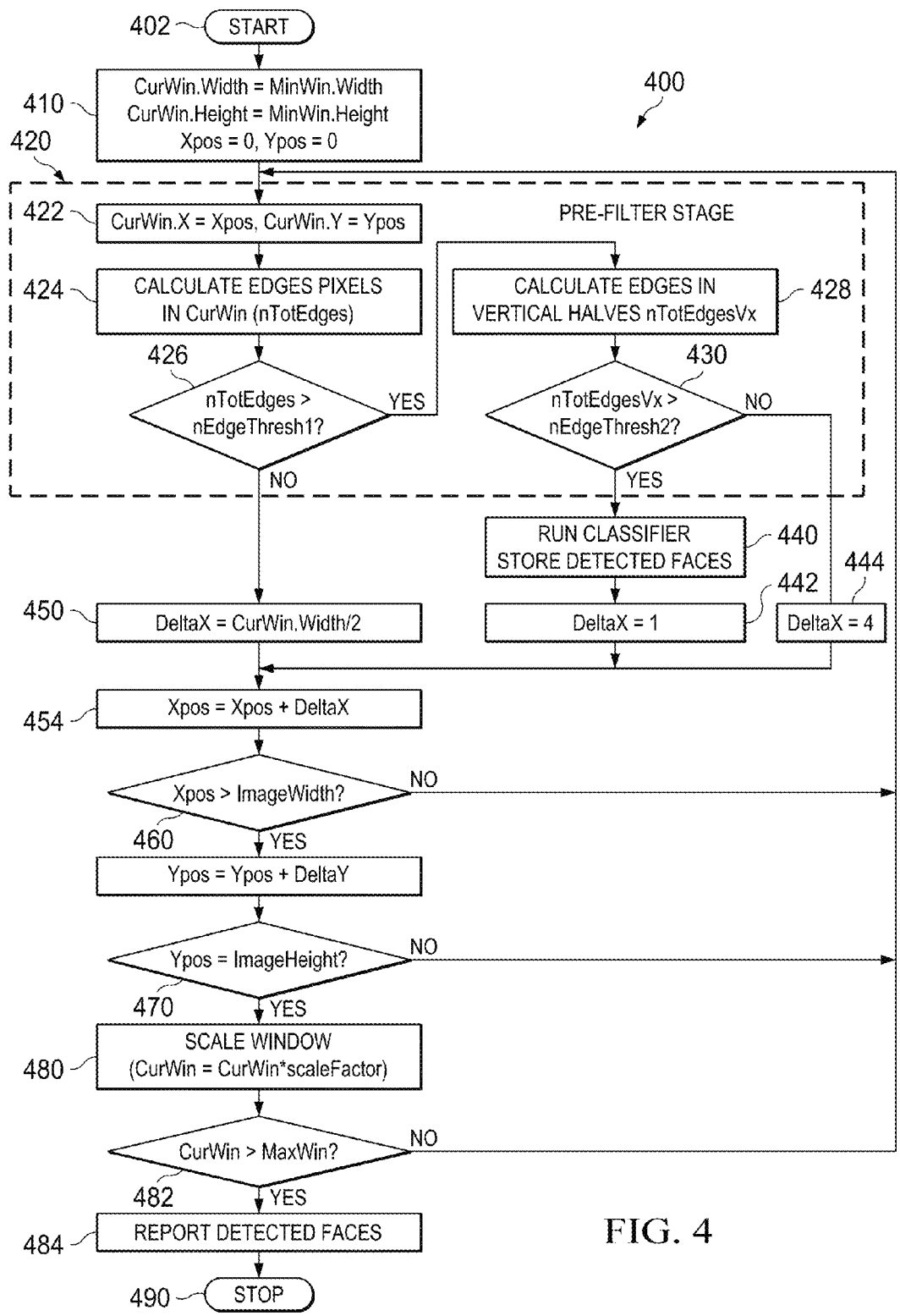
FIG. 4 is a flow chart of an example method in accordance with the present specification.

FIG. 3 discloses an example hardware architecture for performing the method of FIG. 4. In the example hardware architecture, a camera 310 provides a video feed. Optionally (for example, for testing or monitoring purposes) a host PC 320 may also be provided. A multiplexer board 330 mediates communications between camera 310 and host PC 320 on the one hand and an embedded motherboard 340 on the other hand. In this example embodiment, motherboard 340 is an Analog Devices, Inc. BF609EZ evaluation board. Motherboard 340 carries one digital signal processor 350. In this example embodiment, DSP 350 is an Analog Devices, Inc. Blackfin BF609 dual-core processor. The BF609 is equipped with two processing cores 310 as well as a pipeline vision processor (PVP), which is a species of video preprocessor 370. Video preprocessors 370 is configured to perform preprocessing on an input frame, including in the example embodiment, Sobel edge detection as well as generating summed area tables for images.

In the example embodiment, NTSC source 302 provides a video feed to video decoder 344, which may be for example an EI3 extender board from Analog Devices, Inc. an enhanced parallel peripheral interface (EPPI) 346-1, which may be an IEEE-1284-compliant device. An input formatter IPF0 provides appropriate data for calculating integral image (IIM) IIM0. IPF0 also provides data to Sobel edge detector 350, which calculates the Sobel operator on each pixel in the image, using a 5×5-pixel kernel. In particular, three convolutions are performed, and the result is combined with a polar magnitude angle (PMA), which is provided to a thresholding, histogram, and compression (THC) unit. The output of Sobel edge detector 350 is an edge detected image, such as FIG. 2 and FIG. 2A. This is provided to integral image IIM1. Two output formatters, OPF1 and OPF2 interface with cores 330. The integral images are provided by PVP 370 to cores 310, which include an object detector 330. Object detector 330 may be dedicated object detection circuitry, or general purpose instruction circuitry programmed by software instructions to perform object detection, such as the method disclosed in FIG. 4. Detected object windows may be provided to a graphics unit 332, which may be used for example to create a composite image that includes the original image with highlighting applied to detected objects. Graphical output is provided to a second EPPI 346-2, which interfaces with video encoder 342, which may be for example an E13 extender board. Video encoder 342 provides a real-time or near-real-time video stream to display 380.

For development and testing purposes, a PC 320 may interface with motherboard 340, for example via an IEEE 1149.1-compliant JTAG connector.

FIG. 4 is a flow chart of an example object detection method in accordance with the present specification. Object detection method 400 starts at block 402. In block 410, X and Y positions used for searching windows are initialized to zero, and the width and height of the CurWin variable (representing the "current" window being operated on) are initialized to their minimum values. Smaller window sizes will result in more windows to process, thus consuming more computing resources, but will yield higher-resolution detection.

Superblock 420 represents a pre-filter stage that is configured to eliminate M windows from a total of N possible windows in digital image 100. In the example embodiment, each window is a rectangle J×K pixels in size, where J and K need not be variables. In some embodiments of the present specification, J or K may be dynamically adjusted by a value $\partial X$, selected to minimize processing of windows that do not contain the object of interest. In one embodiment, the horizontal component of $\partial X$ is dynamically adjusted responsive to the result of the pre-filter stage of block 420. For example, if after pre-filter stage 420 the window is found to be part of background region 120, we may select $\partial X_x = \text{width}_{window}/2$, wherein $\text{width}_{window}$ is the width of the current window. This selection is safe because it is known that this window does not have sufficient edge pixels. On the other hand, if the window passes the initial foreground/background classification and passes on to the face/non-face symmetry subclassification, $\partial X$ may be selected as higher for non-face windows, and lower for face windows. Similarly, the vertical component of $\partial X$ may be selected based on the total number of foreground windows in the current row. If there are no foreground windows in the current row, then the vertical component of $\partial X$ may be safely selected as $\partial X_y = \text{height}_{window}/2$, wherein $\text{heigh}_{window}$ is the height of the current window.

Pre-filter stage 420 operates on a looping basis, on a window with dimension J×K pixels, which may be dynamically scaled as described above. After each iteration, a new window is selected by incrementing $(X_{pos}, Y_{pos})$ by $\partial X$. In one embodiment, $\partial X_X$ is selected as 1 pixel, 4 pixels, or $\text{width}_{window}/2$, and $\partial X_Y$ is selected as either 1 pixel or $\text{height}_{window}/2$.

In block 422 of pre-filter stage 420, the current window CurWin receives the current $(X_{pos}, Y_{pos})$. In block 424, the total number of edge pixels in CurWin are calculated and stored in the variable nTotEdges. In block 426, nTotEdges is compared to a first threshold value, nEdgeThresh1, which may be for example a value between 25 and 30% of the total pixels in the window. If CurWin has too few edge pixels, then CurWin is identified as a background candidate window, and processing for that CurWin is complete.

If CurWin has sufficient edges to qualify as a foreground candidate, then CurWin is designated for additional processing. In block 428, CurWin is divided into two vertical halves, and the edges are counted in each vertical half, with the result stored in nTotEdgesVx. If nTotEdgesVx is greater than a second threshold nEdgeThresh2, the window is identified as a face candidate.

Outside of the pre-filter stage, in block 450, for windows identified as background windows, $\partial X_X$ is selected as CurWin.Width/2. In block 454, $X_{pos}$ is incremented by $\theta X_X$, and in block 450, $X_{pos}$ is compared to the total width of the image to see if the end of a row has been reached. If not, then execution returns to pre-filter stage 420 to process the next window in the row. In block 460, $Y_{pos}$ is incremented by $\partial X_y$, and in block 470, $Y_{pos}$ is compared to the total image height to see if the last row has been processed. If the last row has not been reached, processing returns to pre-filter stage 420.

If it has been reached, then in block 480, the window size is adjusted by the value scaleFactor, for example adjusting the window size up by a designated factor. Note that in some embodiments, scaleFactor may be dynamically selected based on the results of the last scan.

In block 482, if the size of the current window has exceeded the maximum window size, then no further processing is required. In one example embodiment, minimum and maximum window size is based on a known property of digital image 100. For example, if digital image 100 is a 640×480 pixel-image from a security camera, placed a known distance from an area of interest, then it may be known that a face is likely to occupy a window no larger than for example 100× 100 pixels, and no smaller than 24×24 pixels. It may therefore be inefficient to process windows outside of that example range.

Returning to block 430, if the current window is not classified as a face candidate, then in block 444, $\partial X_X$ is incremented by the example value 4, and processing passes to block 454.

If the current window is classified as a face candidate in block 430, then in block 440, in block 440, additional processing may be performed to increase confidence of the classification. For example, block 440 may include Viola-Jones cascade classifiers as described above, or other object detection or classification techniques known in the art. As a general proposition in one example embodiment, the steps leading up to block 440 are designed, and specific values are selected to ensure a near-zero rate of false negatives, or in other words, to ensure that actual face windows are not rejected before reaching block 440. The rate of false positives may be acceptably larger. In one example embodiment, a false positive rate between 60 to 80 percent is sufficient to meet the example goal of reliably detecting all faces in the image while reducing the processor time necessary so that accurate facial detection can be run in real time, for example at 30 FPS at full-VGA resolution of 640×480 pixels.

Any faces detected in block 440 are stored in memory. After block 440, $\partial X_X$ is incremented by 1, the minimal value being chosen because this region of the image has proven to be a region of interest where a face is more likely to be detected. Control then passes to block 454 as above.

In block 484, any faces that were detected in block 440 are reported to the system, and in block 490 the method terminates.

In an example embodiment, a baseline value for nSobelThresh is established at 500, and is adjusted between each frame of video. A first full frame (i.e., a 640×480 grayscale image) is processed with the baseline threshold, and the total number of edge pixels in the frame are enumerated. The example algorithm will then adjust the threshold for the next frame with a target of keeping the number of edge pixels in the range of 25-30%. For example, as lighting or other conditions change the threshold is adjusted to detect a relatively constant number of edges.

Starting with the baseline threshold of 500, as input frames are received, the example algorithm uses the edge integral image to calculate total edges, according to the formula nNumEdges=aEdge IIM[nImageWidth×nImageHeight−1], where nNumEdges is the number of edges, aEdgeIIM is the integral image buffer, nImageWidth is the image width, and nImageHeight is the image height. The number of edges is compared with the target range of 25-30%, and the threshold is adjusted before the next frame as necessary to bias edge detection toward the desired range. In one example, the algorithm uses two different increment offsets based on the difference between the desired edge count and actual edge count. If the number of detected edges is within 10% of the desired value, a smaller offset of ±50 is added or subtracted, as appropriate. If the edge count is greater than 40% or less than 15%, a larger offset of ±100 is applied. If the edge count is within the nominal range of 25-30%, no adjustments are made to the threshold.

In another example embodiment where multiple cores are available, block 440 above may be run in parallel to the remainder of the method. For example, DSP 350 may dedicate two cores to performing the steps of pre-filter stage 420, while DSP 350 may dedicate the remaining two cores to performing additional cascade classifiers on windows that reach block 440. Thus, in this example embodiment, it is expected that one DSP 350 will perform less-processor-intensive steps on a larger number of windows, while another DSP 350 will perform more-processor-intensive steps on a smaller number of windows. In yet other embodiments, a first DSP 350 may be dedicated to facial detection, while a second DSP 350 could be dedicated to performing facial recognition on faces detected by the first DSP 350. In yet another example embodiment, multiple or faster DSPs 350 together may enable real-time facial detection on high-definition images, for example 16-bit grayscale at 1280×960 pixels.

In yet another example of method 400, classification of background images may be aided by comparison to a baseline. For example, if the image comes from a fixed security camera observing a room, the background will change infrequently. Thus, in one example embodiment, the background is characterized with a baseline image, and later iterations compare windows to known background windows. In the case that the windows substantially match, the region is identified as background and no further processing takes place. Comparison to the baseline may be accomplished, for example, by comparing values from a summed area table (SAT). In some embodiments, the SAT may be generated by PVP 370 to save processor cycles on cores 310. A SAT may be calculated for both the baseline image and the current window. If the difference between the SATs is beneath a threshold, the window is classified as a background window. The threshold may be selected to be relatively low, consistent with the goal of rejecting windows that are identical or nearly-identical to the baseline. In one example embodiment, the comparison to baseline step may be performed before block 424 in method 400. In another example embodiment, comparison to a baseline image is accomplished by comparing edge counts instead of SATs. In this example, it may be assumed that two windows with the same number of edges, within an identity threshold, are identical, without examining the placement of the edges. To help preserve the utility of this comparison, the identity threshold may be a tight threshold. In another example embodiment, comparison to a baseline image is accomplished by comparing centroids of the edge detected image. In this example, it may be assumed that two windows with the same centroids, within an identity threshold, are identical. To help preserve the utility of this comparison, the identity threshold may be a tight threshold.

In the discussions of the embodiments above, any capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. An object detection method, performed on a digital signal processor, for identifying objects of interest in a foreground region of a digital image, the method comprising:
dividing the digital image into a plurality of windows;
performing edge detection on each window;
classifying each window as a foreground candidate or background candidate, wherein classifying comprises computing a number of edges for the window and classifying the window as a foreground candidate only if the number of edges for the window is greater than a threshold; and
performing additional object detection only on those windows classified as foreground candidates.

2. The object detection method of claim 1, wherein performing edge detection on each window comprises computing a Sobel operator for each pixel in the digital image, the Sobel operator have a 5×5 pixel kernel.

3. The object detection method of claim 1, further comprising subclassifying each foreground candidate window as an object-candidate or non-object-candidate window, and performing additional object detection only on object-candidate windows.

4. The object detection method of claim 3, wherein subclassifying each foreground candidate window as an object-candidate or non-object-candidate window comprises:
subdividing the window into two vertical subwindows;
calculating a number of edges in each vertical subwindow;
comparing the number of edges in each vertical subwindow to a second threshold; and
subclassifying the window as an object-candidate window only if the number of edges in each vertical subwindow is greater than the second threshold.

5. The object detection method of claim 3, wherein dividing the digital image into a plurality of windows comprises selecting a scaling factor, a minimum window size, and a maximum window size based on an expected size range for the object to be detected.

6. The object detection method of claim 3, wherein dividing the digital image into a plurality of windows comprises:
for each window, dynamically selecting an offset ∂X from a previous window;
wherein ∂X is selected to be larger for a window classified as a background candidate than for a window classified as a foreground candidate.

7. The object detection method of claim 1, wherein classifying each window as a foreground candidate or a background candidate comprises:
comparing the window to a corresponding window in a baseline second image, and classifying the windows as a background window if the window is substantially identical to the corresponding window.

8. A tangible non-transitory computer-readable storage medium having stored thereon software instructions for a digital signal processor, the instructions adapted for identifying objects of interest in a foreground region of a digital image, the instructions configured to instruct a processor to:
divide the digital image into a plurality of windows;
perform edge detection on each window;
classify each window as a foreground candidate or background candidate, wherein classifying comprises computing a number of edges for the window and classifying the window as a foreground candidate only if the number of edges for the window is greater than a threshold; and
perform additional object detection only on those windows classified as foreground candidates.

9. The tangible non-transitory computer storage medium of claim 8, wherein performing edge detection on each window comprises computing a Sobel operator for each pixel in the digital image, the Sobel operator have a 5×5 pixel kernel.

10. The tangible non-transitory computer storage medium of claim 8, further comprising subclassifying each foreground candidate window as a face-candidate or non-face-candidate window, and performing object detection only on face-candidate windows.

11. The tangible non-transitory computer storage medium of claim 10, wherein subclassifying each foreground candidate window as an object-candidate or non-object-candidate window comprises:
subdividing the window into two vertical subwindows;
calculating a number of edges in each vertical subwindow;
comparing the number of edges in each vertical subwindow to a second threshold; and
subclassifying the window as an object-candidate window only if the number of edges in each vertical subwindow is greater than the second threshold.

12. The tangible non-transitory computer storage medium of claim 10, wherein dividing the digital image into a plurality of windows comprises selecting a scaling factor, a minimum window size, and a maximum window size based on an expected size range for the object to be detected.

13. The tangible computer storage medium of claim 8, wherein dividing the digital image into a plurality of windows comprises:
for each window, dynamically selecting an offset ∂X from a previous window;
wherein ∂X is selected to be larger for a window falling in the background window than for a window falling in the foreground window.

14. The tangible computer storage medium of claim 8, wherein classifying each window as a foreground candidate or a background candidate comprises:
comparing the window to a corresponding window in a baseline second image, and classifying the windows as a background window if the window is substantially identical to the corresponding window.

15. A digital signal processing system configured to identify objects of interest in a foreground region of a digital image with reduced consumption of clock cycles, the system comprising:
a processor; and
a memory communicatively coupled to the processor and having stored thereon instructions that, when executed, instruct the processor to:
divide the digital image into a plurality of windows;
perform edge detection on each window;
classify each window as a foreground candidate or background candidate, wherein classifying comprises computing a number of edges for the window and classifying the window as a foreground candidate only if the number of edges for the window is greater than a threshold; and
perform additional object detection only on those windows classified as foreground candidates.

16. The digital signal processing system of claim 15, wherein performing edge detection on each window comprises computing a Sobel operator for each pixel in the digital image, the Sobel operator have a 5×5 pixel kernel.

17. The digital signal processing system of claim 15, further comprising subclassifying each foreground candidate window as a face-candidate or non-face-candidate window, and performing object detection only on face-candidate windows.

18. The digital signal processing system of claim 17, wherein subclassifying each foreground candidate window as an object-candidate or non-object-candidate window comprises:
subdividing the window into two vertical subwindows;
calculating a number of edges in each vertical subwindow;
comparing the number of edges in each vertical subwindow to a second threshold; and
subclassifying the window as an object-candidate window only if the number of edges in each vertical subwindow is greater than the second threshold.

19. The digital signal processing system of claim 17, wherein dividing the digital image into a plurality of windows comprises selecting a scaling factor, a minimum window size, and a maximum window size based on an expected size range for the object to be detected.

20. The digital signal processing system of claim 15, wherein dividing the digital image into a plurality of windows comprises:
dynamically selecting a an offset ∂X from a previous window;
wherein ∂X is selected to be larger for a window falling in the background window than for a window falling in the foreground window.

21. The digital signal processing system of claim 15, wherein classifying each window as a foreground candidate or a background candidate comprises:
comparing the window to a corresponding window in a second image, and classifying the windows as a background window if the window is substantially identical to the corresponding window.

* * * * *